March 4, 1941.  W. RIEGER  2,233,556
METHOD OF MAKING RETURN BENDS
Filed Oct. 30, 1937
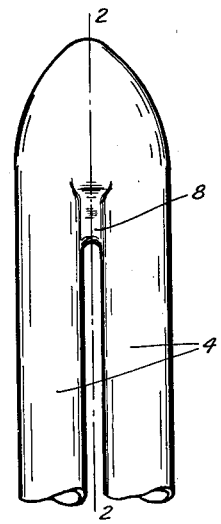
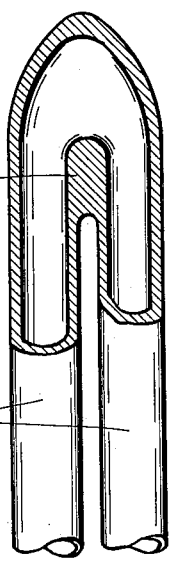
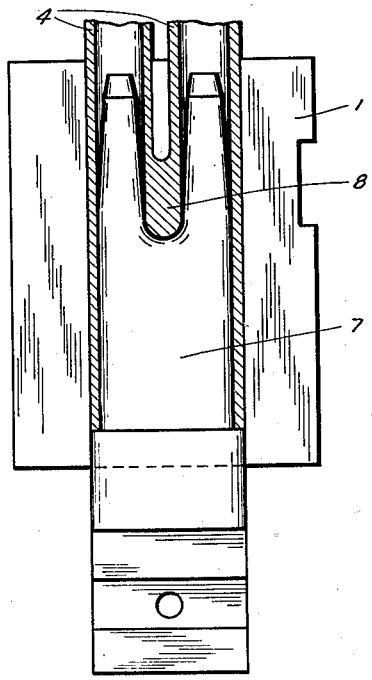
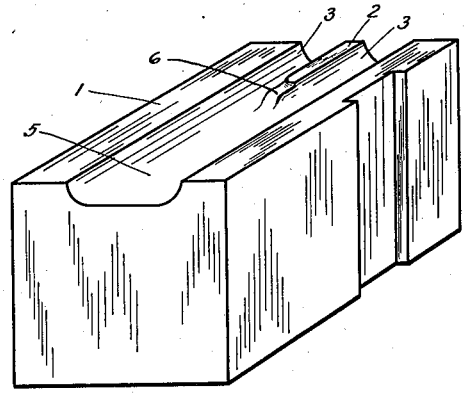
INVENTOR
WILHELM RIEGER.
BY
ATTORNEY Patented Mar. 4, 1941

2,233,556

UNITED STATES PATENT OFFICE 2,233,556

METHOD OF MAKING RETURN BENDS

Wilhelm Rieger, Kassel-Wilhelmshohe, Germany, assignor to The Superheater Company, New York, N. Y.

Application October 30, 1937, Serial No. 171,856
In Germany December 30, 1936

2 Claims. (Cl. 29—157.6)

According to a known welding process for the fabrication of return bends made up of two or more tubes, the tubes are heated and inserted in a die and are then welded to each other by the introduction of a suitably shaped plunger.

This results in what is usually referred to as a breeches piece whose open end is next closed by a separate step. As usually practiced this process is such that compared with the general wall thickness of the tubes there is a reinforcement of the wall both at the inner or crotch area as well as along the outer arc of the closure. This process has been so successful that return bends made by it have been very generally adopted. Under certain operating conditions however and with certain forms of superheater elements the unequal temperature and consequent unequal expansion of the two tube lengths connected by the return bend has caused stresses to occur at the return bend which may at times cause a failure. The object of the present invention is to modify the process in such a way that a further reinforcement is provided at the return bend which will effectively prevent any rupture at this point. The invention consists in forming an exterior reinforcing web during the forging process, this web connecting the two tubes to each other. The welding is performed by means of a die which has in general the same form as dies used heretofore for this process, but modified by having the wall which separates the two bores formed in the die to hold the two tubes relieved at the crotch to receive metal upset during the forging to form the desired web.

In the drawing there is represented in Figs. 1 to 3 an illustrative example of a return bend in accordance with the invention. Of these three figures, Fig. 1 shows a plan view of a return bend; Fig. 2 is a section on line 2—2 of Fig. 1, and Fig. 3 is a section on line 3—3 of Fig. 2; Fig. 4 shows one of the two die halves with the two tubes in position, the plunger being shown in the position which it occupies when it has completed its inward stroke, and Fig. 5 shows a perspective view of one of the two die halves.

Each of the two halves 1 of the die is equipped with the usual two semi-cylindrical grooves 3—3 separated by the wall 2, the tubes being placed in the grooves 3. The separating wall 2 does not extend throughout the length of the die, the two semi-cylindrical cavities 3—3 opening for part of the length of the die into a connecting cavity or passage 5, in which cavity the two tubes are during the welding process formed into the common piece connecting the two tubes. At the inner end of the wall 2, i. e. the end facing the cavity 5, the wall 2 is cut off diagonally. The wall ends in a slightly arcuate surface 6. When the two die halves are placed in their operative relative position, there will thus be formed an elongated space into which the plunger 7 will force material from the tubes during the welding operation. If necessary, the process can be carried out in several steps with intermediate reheating, if required.

In this manner there will be formed at the return bend area of the breeches piece a web 8 extending between the two branches of the piece and connecting the two tubes. The thickness of this connecting web is increased toward the crotch and is therefore greatest where the danger of rupture is greatest. Not only does this construction provide increased mechanical strength but it also presents increased guarantee against leakage from the interior steam pressure at this critical point. With the exceedingly high steam pressures used in modern practice there is a certain amount of difficulty in making the crotch of the return bend sound enough to meet the requirements. The invention improves matters since the additional material forced into the structure at this point provides such a section that steam is effectively prevented from leaking out at this point.

While in the drawing the finished article is shown as a return bend, the invention will evidently be equally applicable to cases where the two tubes are connected to a common end which is however not closed to form a return bend but is left open and is connected to a third pipe to form a Y. Obviously, too, the invention is applicable to cases where more than two pipes, lying for example in a common plane, are connected into a "manifold" structure.

What I claim is:

1. In the art of connecting two pipes into a "breeches-piece" by the steps of heating the portions adjacent to the ends to be connected, holding the pipes in the position they will occupy when connected, slitting the walls facing each other for a distance inward from the end, and bending the portions adjacent to the slits out thereby bringing their edges into contact and welding them to each other, the improvement consisting in forcing part of the material of the pipes into the space between facing portions of the two pipes beyond the crotch of said breeches piece to form a web extending from the crotch of the breeches piece between and along the pipes, said web being integral with the two pipes.

2. The improvement according to claim 1, the slitting of the walls, bending out of the portions, welding of the edges, and forming of the web all being done in one operation.

WILHELM RIEGER.